US012373345B2

(12) United States Patent
Trantham et al.

(10) Patent No.: US 12,373,345 B2
(45) Date of Patent: *Jul. 29, 2025

(54) INTELLIGENT MANAGEMENT OF FERROELECTRIC MEMORY IN A DATA STORAGE DEVICE

(71) Applicant: Seagate Technology LLC, Fremont, CA (US)

(72) Inventors: Jon D. Trantham, Chanhassen, MN (US); Praveen Viraraghavan, Chicago, IL (US); John W. Dykes, Eden Prairie, MN (US); Ian J. Gilbert, Chanhassen, MN (US); Sangita Shreedharan Kalarickal, Eden Prairie, MN (US); Matthew J. Totin, Exelsior, MN (US); Mohamad El-Batal, Superior, CO (US); Darshana H. Mehta, Shakopee, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,118

(22) Filed: Nov. 6, 2023

(65) Prior Publication Data

US 2024/0070070 A1    Feb. 29, 2024

Related U.S. Application Data

(63) Continuation of application No. 17/730,920, filed on Apr. 27, 2022, now Pat. No. 11,853,213.

(Continued)

(51) Int. Cl.
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0655* (2013.01); *G06F 3/0679* (2013.01); *G06F 2212/60* (2013.01)

(58) Field of Classification Search
CPC .. G06F 12/0802; G06F 3/0604; G06F 3/0655; G06F 3/0679; G06F 2212/60
(Continued)

(56) References Cited

U.S. PATENT DOCUMENTS 886,880 A    5/1908    Shepherd
5,600,587 A    2/1997    Koike
(Continued)

*Primary Examiner* — Reginald G Bragdon
*Assistant Examiner* — Aaron D Ho
(74) *Attorney, Agent, or Firm* — HOLZER PATEL DRENNAN

(57) ABSTRACT

Method and apparatus for managing a front-end cache formed of ferroelectric memory element (FME) cells. Prior to storage of writeback data associated with a pending write command from a client device, an intelligent cache manager circuit forwards a first status value indicative that sufficient capacity is available in the front-end cache for the writeback data. Non-requested speculative readback data previously transferred to the front-end cache from the main NVM memory store may be jettisoned to accommodate the writeback data. A second status value may be supplied to the client device if insufficient capacity is available to store the writeback data in the front-end cache, and a different, non-FME based cache may be used in such case. Mode select inputs can be supplied by the client device specify a particular quality of service level for the front-end cache, enabling selection of suitable writeback and speculative readback data processing strategies.

20 Claims, 4 Drawing Sheets

Related U.S. Application Data

(60) Provisional application No. 63/201,394, filed on Apr. 28, 2021.

(58) Field of Classification Search
    USPC .......................................................... 711/118
    See application file for complete search history.

(56) References Cited

U.S. PATENT DOCUMENTS

| | | | |
|---|---|---|---|
| 6,356,980 B1* | 3/2002 | Arimilli | G06F 12/0888 |
| | | | 711/138 |
| 7,721,048 B1 | 5/2010 | Sendag et al. | |
| 8,402,226 B1* | 3/2013 | Faibish | G06F 12/0804 |
| | | | 711/143 |
| 8,554,982 B2 | 10/2013 | Nishihara et al. | |
| 8,639,989 B1* | 1/2014 | Sorenson, III | G06F 11/2071 |
| | | | 709/224 |
| 8,966,181 B2 | 2/2015 | Chen et al. | |
| 9,269,438 B2 | 2/2016 | Nachimuthu et al. | |
| 9,740,616 B2 | 8/2017 | Busaba et al. | |
| 2007/0016719 A1* | 1/2007 | Ono | G06F 12/0804 |
| | | | 711/E12.04 |
| 2007/0174551 A1* | 7/2007 | Cornwell | G06F 12/0888 |
| | | | 711/170 |
| 2014/0082286 A1* | 3/2014 | Chou | G06F 12/0862 |
| | | | 711/119 |
| 2017/0052721 A1* | 2/2017 | Yamaji | G06F 3/0659 |
| 2019/0294546 A1* | 9/2019 | Agarwal | G06F 3/0611 |
| 2021/0042227 A1* | 2/2021 | Sandberg | G06F 12/0802 |
| 2021/0089472 A1* | 3/2021 | Ishii | G06F 12/121 |
| 2022/0057952 A1* | 2/2022 | Bueb | G06F 3/0659 |

\* cited by examiner

FERROELECTRIC TUNNEL JUNCTION (FTJ)

FeRAM (1T-1C) FERROELECTRIC CAPACITOR MEMORY CELL

FeFET MEMORY CELL

INTELLIGENT MANAGEMENT OF FERROELECTRIC MEMORY IN A DATA STORAGE DEVICE

CROSS-REFERENCE TO RELATED APPLICATIONS

This application is a continuation application of U.S. patent application Ser. No. 17/730,920 filed on Apr. 27, 2022 and entitled INTELLIGENT MANAGEMENT OF FERROELECTRIC MEMORY IN A DATA STORAGE DEVICE, which is a non-provisional application under 35 U.S.C. 119(e) based on U.S. Provisional Patent Application No. 63/201,394 filed Apr. 28, 2021, the contents of all of which are hereby incorporated by reference.

SUMMARY

Without limitation, various embodiments of the present disclosure are generally directed to the intelligent caching of data in a local ferroelectric based memory of a data storage device, such as but not limited to a solid-state drive (SSD).

In some embodiments, an apparatus includes a front-end cache made up of ferroelectric memory element (FME) cells, such as but not limited to FeRAM, FeFET and/or FTJ memory cells. Prior to storage of writeback data associated with a pending write command from a client device, an intelligent cache manager circuit forwards a first status value indicative that sufficient capacity is available in the front-end cache for the writeback data. Non-requested speculative readback data are transferred to the front-end cache from the main NVM memory store, and these speculative readback data may be jettisoned to accommodate the writeback data. A second status value may be supplied to the client device if insufficient capacity is available to store the writeback data in the front-end cache, and a different, non-FME based cache may be used in such case. Mode select inputs can be supplied by the client device specify a particular quality of service level for the front-end cache, enabling selection of suitable writeback and speculative readback data processing strategies.

These and other features and advantages of various embodiments can be understood with a review of the following detailed description in conjunction with the accompanying drawings.

BRIEF DESCRIPTION OF THE DRAWINGS

The disclosure will be readily understood by the following detailed description in conjunction with the accompanying drawings, wherein like reference numerals designate like structural elements.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Figure 1:
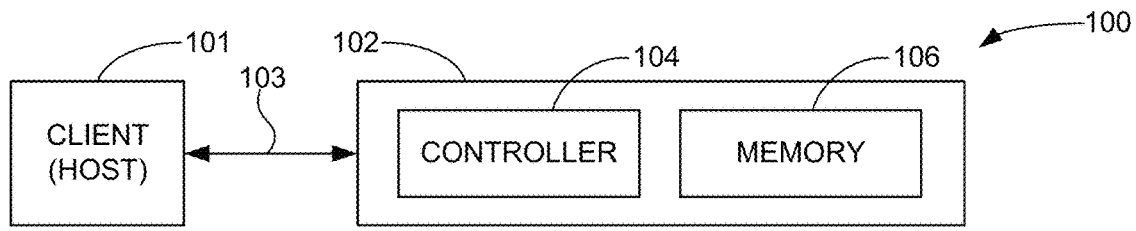
FIG. 1 is a functional block diagram of a data processing system constructed and operated in accordance with various embodiments.

Various embodiments of the present disclosure are generally directed to systems and methods for providing a data storage device with ferroelectric memory to enhance functional operation and throughput of the data storage device.

FMEs are semiconductor based memory elements that provide non-volatile data storage with fast response and low power consumption characteristics. A typical FME includes a stack of layers such as one or more conductive electrodes, a ferroelectric layer, a tunneling layer, an optional dielectric layer, etc. Data bit(s) are stored by an FME in relation to the programmed electric polarity of the ferroelectric layer of the element.

Different electrical polarities provide different current densities through the memory element as current is passed through the programmed ferroelectric layer. In this way, FMEs can be considered to operate in a manner similar to resistive random access memory (RRAM), phase change memory, spin-torque memory, etc., where a programmed state can be detected based on different electrical responses (e.g., different conductivity, current density, resistance, voltage drop, etc.) across the element.

A variety of FME constructions have been proposed. These include ferroelectric tunneling junctions (FJTs), ferroelectric field effect transistors (FeFETs), and ferroelectric random access memory (FeRAM). Other forms of FMEs have been proposed as well.

Generally, FTJs are somewhat analogous to magnetic tunneling junctions (MTJs) and are usually arranged as two-junction cells with a ferroelectric layer and a tunneling barrier layer sandwiched between opposing electrodes. FTJs are particularly suitable for cross-point arrays and other architectures with two connection points to each memory element.

FeFETs are somewhat analogous to flash memory cells and generally include a gate structure arranged between respective source and drain doped regions. The gate structure includes a ferroelectric layer. FeFETs usually have three-junctions (drain, source, gate) and can be readily arranged into two-dimensional (2D) or three-dimensional (3D) structures FeRAM cells are somewhat analogous to DRAM cells and are usually arranged with at least one transistor and at least one capacitor. The capacitor includes a ferroelectric layer. A tunneling barrier layer may also be provided in the capacitor as well. A number of FeRAM arrangements have been proposed, including 1T1FC (one-transistor, one-ferroelectric capacitor) cells, 2T2C cells, 1T4C cells, 6T4C cells, etc. The transistor in each FeRAM cell may be a traditional transistor (e.g., a conventional field effect transistor, FET), although in some cases ferroelectric layer(s) can be applied to the gate structure of the transistor as well as to the capacitor ("dual layer FeRAM").

A variety of materials, metals and alloys can be used to make up the respective ferroelectric, tunneling and electrode layers. Suitable materials for the ferroelectric layer can include, without limitation, HfO2, ZrO2, Hf1-xZxO2, etc. These materials may be doped with other elements such as but not limited to Si, Ge, Al, Ti, Sc, Y, La, Ce, Gd, Nb, Sr, Ba, N, etc. The tunneling layer(s) may be a suitable non-ferroelectric dielectric including, but not limited to Al2O3, MgO, SrTiO3, etc. Electrodes are electrically conductive material and may include, without limitation, TiN, TaN, Pt, Ag, CrRu, CrMo, CrW, CrTi, and RuAl. In some cases, anti-ferroelectric materials such as ZrO2 may be used in the place of the ferroelectric layer if an internal bias field, e.g., from two dissimilar electrodes, is introduced in order to shift its hysteresis loop to enable the storage of binary information. These and other examples are merely illustrative and are not limiting.

Data storage devices can come in many forms, but all such devices usually have a top level controller and a memory. The controller manages overall operation of the device and can include one or more programmable processors and associated memory to which firmware (FW) is loaded and executed by the processor(s). The memory can take any number of forms, such as flash memory in a conventional solid-state drive (SSD).

So-called front-end memory is often provided as part of the controller. This front-end memory can take a variety of forms (e.g., SRAM, DRAM, NOR flash, NAND flash, etc.) and serves various storage functions to support the transfers of data between the memory and an external client. In one traditional arrangement, an SSD can include an internal data cache formed of SRAM. This memory can be a separate IC device or can be incorporated within a system on chip (SOC) that incorporates the processors and is primarily used to cache first level map metadata describing data stored in the memory. A traditional SSD arrangement can further incorporate an external memory that is separate, but linked to, the SOC, such as DRAM which is used to store the processor FW, and cached map metadata.

Another portion of the external DRAM, or another portion of local memory accessible by the device controller, is designated as a read buffer. This is a location to which retrieved data from the main memory are stored pending transfer to the requesting client. Yet further local memory can be arranged as a write cache which can be formed of non-volatile memory (NVM) such as NAND or NOR flash memory. The write cache serves to temporarily stored cached write data that have been received from the external client, and are awaiting transfer to the main memory. At this point it will be noted that numerous other local memory types and locations can be utilized as well, such as local buffers, keystores, etc. These can be configured as required for use by the data storage controller to manage the transfer, ultimately, of user data between the main data store of the storage device and the requesting client.

The present disclosure contemplates using ferroelectric memory to form one or more local memory locations of a storage device controller. As described below, some embodiments form the write cache of ferroelectric memory (rather than flash memory as currently implemented). In further cases, the read buffer may additionally or alternately be formed of ferroelectric memory. In yet further cases, a large ferroelectric memory may be utilized (such as a 2D or 3D structure) and portions of the memory are separately and potentially allocated for use as separate write cache and read buffer locations. It will be noted that other aspects of the local memory can also be implemented using ferroelectric memory. For example, local memory used by the storage device controller to store map metadata can be formed of FME memory.

Ferroelectric memory combines the speed advantages of DRAM with the non-volatile and stackability of flash. Ferroelectric memory is based on FMEs, or ferroelectric memory elements. FMEs can take a large variety of forms (e.g., FTJs, FeFETs, 1T1FC, 1T4FC, 2T2FCs, etc.). Regardless of configuration, an FME stores data in relation to a programmed electric polarity impressed upon an embedded ferroelectric layer. Because FMEs provide read/programming speeds in the nanosecond range, these elements provide a number of potentially valuable usages in the front end of an otherwise conventional storage device.

In one aspect of the present disclosure, client reads are accessed and processed by the storage device, and more data than requested are retrieved from the main store (such as flash memory) based on pattern detection of existing and recent controller activity. These retrieved readback data sets are temporarily stored in the local read buffer, which as noted above may be formed of ferroelectric memory. The cached readback data may be retained in an effort to successfully achieve cache hits, so that future read requests can be satisfied directly from the read buffer rather than requiring the scheduling and execution of a read upon the flash memory.

In another related aspect of the present disclosure, client write commands will be issued by the client to the storage device. An intelligent processing approach is applied based on availability to receive the writeback cache data from the client in cache lines of the ferroelectric memory. Once a write is received, a bit status may be sent back based on available cache space in the ferroelectric memory. In some cases, other local memory may be provided that is not ferroelectric (e.g., DRAM, flash, etc.), and the decision may be made that if the data can be accommodated in the ferroelectric memory a first status is sent, and if the data cannot be accommodated in the ferroelectric memory (but potentially in other forms of memory), a different, second status is sent.

Yet further aspects may manage the ferroelectric memory to maintain a selected amount of available capacity to accommodate current and expected write data caching. The speed, power and density advantages of ferroelectric memory can be utilized to establish these parameters. The overall goal is to manage the ferroelectric memory front-end intelligently in such a way as to maintain certain QoS (quality of service) and data throughput performance levels for the client. To this end, some embodiments provide an overall cache manager that provides different writeback and readback data processing strategies based on mode select inputs from the client, ongoing utilization history data, and specific client read/write commands from the host.

FIG. 1 shows a functional representation of a data processing system 100 constructed and operated in accordance with various embodiments. It is contemplated albeit not necessarily required that the data processing system 100 is formed of inorganic matter, such as semiconductor circuits, to perform computational operations as described below. The system 100 includes a client (host) device 101 that communicates with a data storage device 102 via an interface 103. The client device 101 may take the form of a personal computer, a smart phone, a workstation, a tablet, a laptop, a gaming system, a microcontroller, a server, an edge device, an Internet of Things (IoT) device, a mass storage array, a RAID controller, etc. Other configurations are contemplated and are included in the coverage of the present disclosure. Essentially any form of integrative input device is included in the context of the client device 101, and none are excluded, including future developed and utilized devices that do not yet exist as of the time of the filing of this application. Any computer system, of whatever type, that queries a system in the manner described herein, is included in the conception of the client device 101.

The data storage device 102 is configured to store and retrieve data utilized by the user of the client device 101 and may be a local processor memory, a data cache, a server cache, a RAID storage system, a cloud storage system, a solid-state drive (SSD), a hard disc drive (HDD), a hybrid storage device, an array of storage devices, a portable thumb (e.g., USB) drive, etc. Any form of data storage device is included in the memory 104, including future developed memory configurations. Any form of memory that stores data, and the contents of which can be recalled by a system such as the client device 101, is included in this definition.

The interface 103 can take substantially any form including but not limited to a local wired or wireless interface, a local area network (LAN), a wide area network (WAN), a cloud computing interface, the Internet, etc. Substantially any useful interface protocol can be implemented for the interface 103 including Ethernet, USB, SCSI, SAS, Fibre Channel, PCMI, wireless connections, etc.

Of interest is the data storage device 102, which is shown to include a controller 104 and a memory 106. The controller 104 can include one or more programmable processors that execute program instructions stored in a local memory to carry out various functions, including the control of data transfers between the memory 106 and the client 101 across the interface 103. Additionally or alternatively, the controller 104 can utilize a hardware circuitry such as formed of ASCI (application specific integrated circuits), FPGA (field programmable gate arrays), state machines, or other arrangements of gate logic.

The memory 106 can include any number of useful forms including local memory for the controller, cache memory, buffer, main storage, etc. The memory 106 includes non-volatile memory (NVM), which will be understood, consistent with the customary usage of this term, as persistent memory that continues to retain information stored therein even after the removal of applied power to the memory. The form of the main data store can take any number of forms, including semiconductor based memory, rotatable data storage memory, tape based memory, etc.

Figure 2:
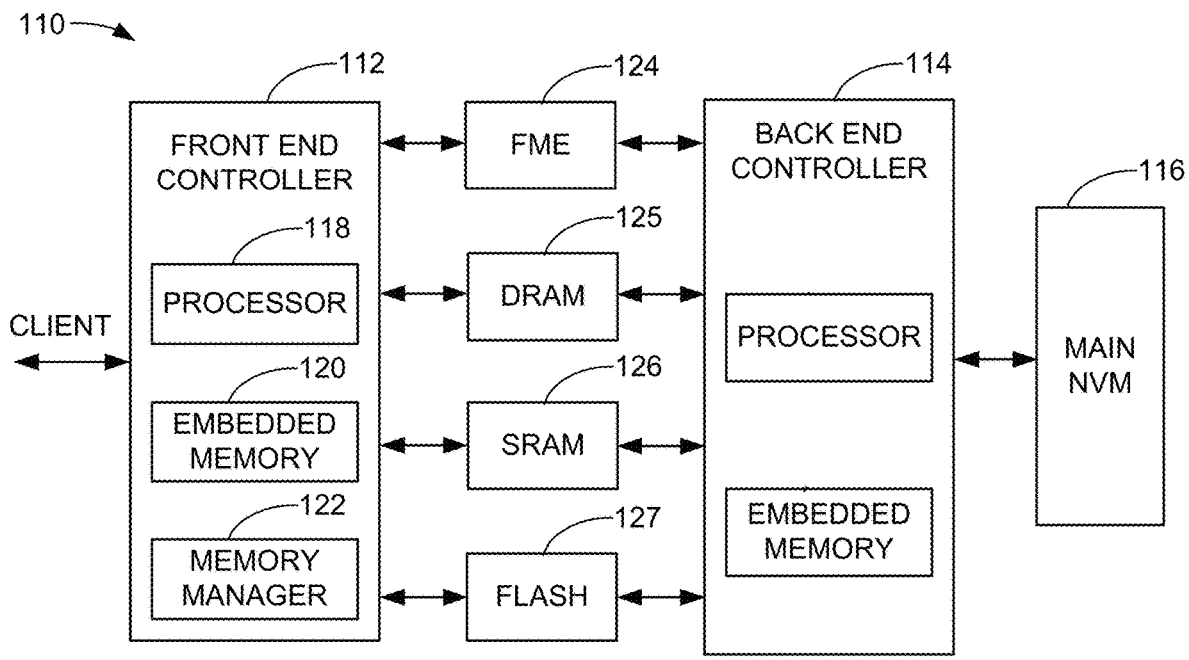
FIG. 2 is a functional block representation of the data storage device of FIG. 1 characterized as a solid-state drive (SSD) in some embodiments.

FIG. 2 depicts aspects of a data storage device 110 that corresponds to the data storage device 102 of FIG. 1 in some embodiments. In FIG. 2, the data storage device 110 is characterized as a solid-state drive (SSD) that utilizes flash memory as a main memory store. This is not limiting, as any number of other forms of data storage devices can be utilized, including but not limited to hard disc drives (HDDs), hybrid drives, tape drives, optical drives, magneto-optical (MO) drives, etc. to provide a main memory store to store data.

The SSD 110 includes a front end controller 112, a back end controller 114 and a main NVM data store memory 116. As noted above, the NVM data store memory 116 may be a flash memory, although other configurations can be used. Front end electronics can be supplied and incorporated into the memory 116 as required, and such are acknowledged but are not of any particular significance, and are thus not addressed in the present discussion. It will nonetheless be understood that the various embodiments described below can be readily incorporated into the NVM data store memory 116 as desired.

The front end controller 112 includes at least one programmable processor 118. This is a device that operates responsive to program instructions supplied by a local memory. It will be understood that the use of one or more programmable processors is contemplated but not required; in other embodiments, hardware circuits that do not incorporate programming instructions can be utilized in the various circuits disclosed herein, as the ability of programming circuits are not required to carry out the various functions described by the present disclosure.

Nevertheless, the embodiment of FIG. 2 has the front end controller 112 including the programmable processor 118 as well as an embedded memory 120 and a memory manager circuit 122. The embedded memory 120 can be formed of any suitable memory construction, including a construction that involves FMEs. The memory manager 122 manages various memories under the control and use of the processor 118.

Local memories are denoted in FIG. 2 that are under the use and control of the front end controller 112. These include an FME memory 124, a DRAM (dynamic random access memory) 125, an SRAM (static random access memory) 126, and an a flash memory 127. Other arrangements can be used.

The collective memory represented by the elements 124-127 are either internal memory locations integrated within the IC (integrated circuit) formulation of the front end controller 112 or are integrated into separate IC devices coupled to the front end controller 112.

Regardless, these elements 124-127, hereinafter described as controller memory, are used in a variety of ways to manage the operation of the SSD 110. These operations can include, but are not limited to, the arrangement of the memory as a write cache, a read buffer, and an internal processor memory.

Figure 3:
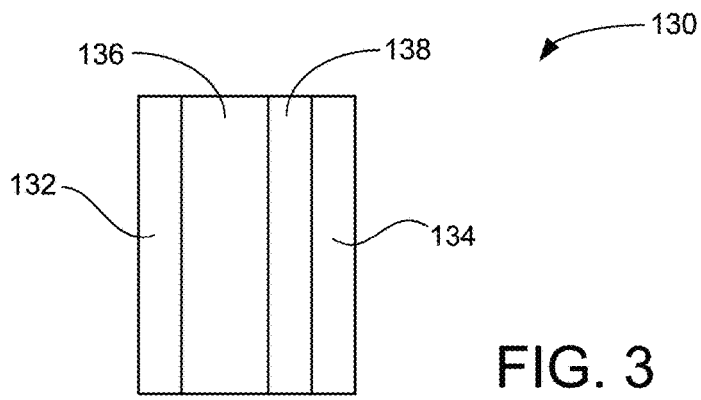
FIG. 3 is a functional block diagram of a ferroelectric memory element (FME) configured as a ferroelectric tunneling junction (FTJ).

FIG. 3 shows a construction of an FME as an FTJ 130. The FTJ 130 is a two-terminal device with outer conductive electrode layers 132, 134, an inner (programming) layer of ferroelectric material 136, and an optional tunnel barrier layer 138. The tunnel barrier layer 138 is contemplated but not necessarily required as a separate layer, and may be any suitable material such as but not limited to a non-ferroelectric material, a dielectric material, etc.

With the appropriate choice of electrode materials, tunnel barrier, and ferroelectric layer, the resistance of the FTJ can be made to depend on the orientation of the ferroelectric polarization of the ferroelectric layer 136. Stated another way, an FTJ such as the FTJ 130 operates in a manner similar to magnetic tunnel junctions (MTJs), and will present different electrical resistances between electrodes 132, 134 based on the programmed polarization of the ferroelectric layer 136. The differences in electrical resistance will vary depending on construction, but differential resistance values can be greater than $10^4$ ohms.

Figure 4:
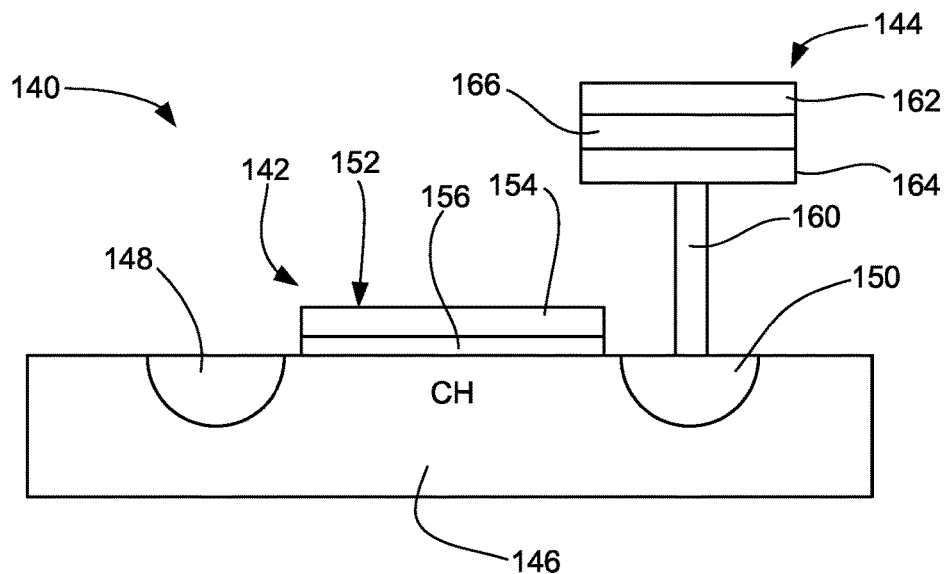
FIG. 4 shows an FME configured as an FeRAM (ferroelectric magnetic random access memory) cell.

FIG. 4 shows another example construction for each of the FMEs memory as FeRAM cells 140. Each FeRAM cell 140 is characterized as a 1T1C arrangement, although other configurations can be used. The FeRAM cell 140 includes at least one transistor 142 and at least one capacitor 144. Each transistor 142 is formed using a base semiconductor substrate 146 with respective doped regions 148, 150 to form respective source and drain regions. A channel (CH) is formed between these respective regions, as shown. A gate structure 152 is disposed between the source and drain regions 148, 150 adjacent the channel region. The gate structure 142 includes a conductive gate 154 and an isolating region 156.

The capacitor 144 extends from the drain region 150 via conductive path 160.

The capacitor structure includes upper and lower electrode layers 162, 164. A ferroelectric layer 166 is disposed between the electrode layers 160, 162. As desired, a tunneling layer (not separately shown) can also be provided between the electrode layers. In this way, the control gate voltage applied to electrode conductive gate 154 can be used to determine the electric polarity of ferroelectric layer 166 in relation to the amount of voltage required to place the transistor into a forward conductive state from source to drain 148, 150. While a 1T1C construction is shown, other constructions can be provided including but not limited to a 2T2C construction, a 2T6C, construction, and so on. Generally, an FeRAM cell has both (at least one) transistor and (at least one) capacitor and at least one of these elements has a ferroelectric layer.

Figure 5:
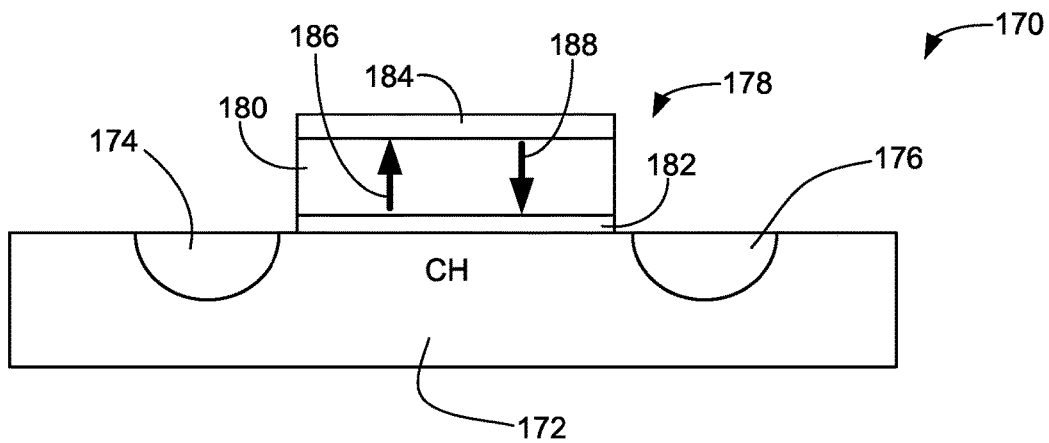
FIG. 5 shows an FME configured as a FeFET (ferroelectric field electric transistor).

FIG. 5 shows an FME memory cell element configured as an FeFET 170. The FeFET 170 includes a semiconductor substrate 172 in which doped regions 174, 176 are formed to provide respective source and drain regions. A gate structure 178 is provided between the source and drain regions 174, 176 to manage a channel (CH) therebetween. The gate structure 178 includes a ferroelectric layer 180 sandwiched between a tunneling barrier layer 182 and an electrically conductive gate layer 184. The ferroelectric layer 180 can be polarized in different directions to provide different ferroelectric responses through the junctions of the FeFET 170. These different polarizations are represented by alternative arrows 186, 188.

Figure 6:
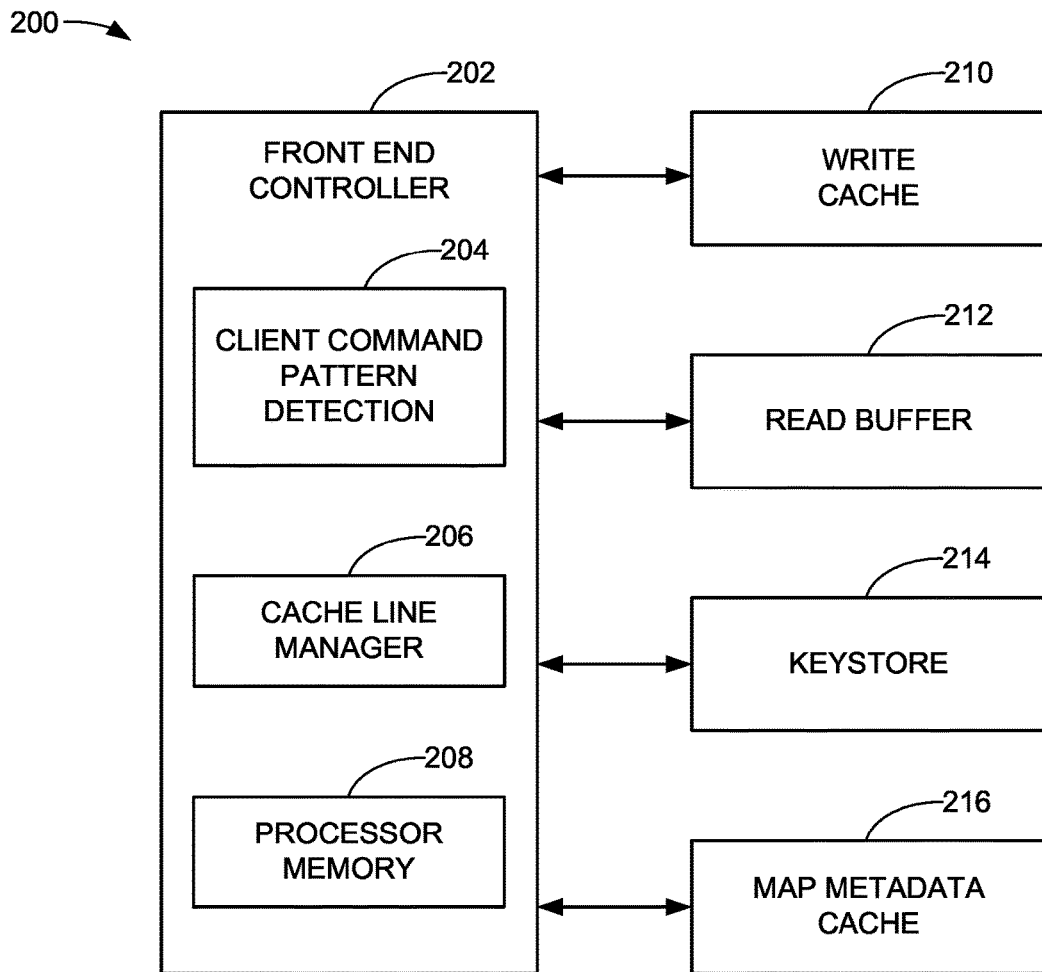
FIG. 6 shows a data processing circuit that uses FMEs in various applications in accordance with some embodiments.

FIG. 6 shows a system 200 that corresponds to aspects of the SSD 110 from FIG. 2. The system 200 includes a front end controller 202 similar to the controllers discussed above. The controller includes a client command pattern detection module 204 and a cache line manager 206. The respective circuits 204, 206 of the front end controller 202 can be realized in hardware or in software/firmware. That is, these circuits can be hardwired using gate logic or similar semiconductor based elements and/or can be realized using one or more programmable processors which have associated program instructions that are stored in a local processor memory 208 and which are executed by said processor(s) to carry out the specified functions.

Coupled to the front end controller are various circuit elements including a write cache 210, a read buffer 212, a keystore 214 and a map metadata cache 216.

These elements can be incorporated into the same integrated circuit that incorporates the front end controller (such as in the environment of an SOC) or can be separate elements. It will be noted that the write cache 210 operates as described above to aggregate data units for transfer to the NVM of the data storage device (such as the main NVM 116 in FIG. 2).

The read buffer 212 is a temporary storage location useful in storing read back storage sets from the main NVM prior to subsequent transfer to the requesting client. The keystore 214 is a secure storage location in which important cryptographic storage information is stored for use during various operations of the SSD 110, including the encryption and decryption of user data transferred between the client device and the NVM. The map metadata cache 216 represents a memory location used to store map metadata useful in identifying and tracking the locations of various user data sets and other control information utilized in the above operations. It will be appreciated that each of these respective elements, including but not limited to the processor memory 208, the write cache 210, the read buffer 212, the keystore 214 and the map metadata cache 216 can be realized using FME elements as described herein.

Figure 7:
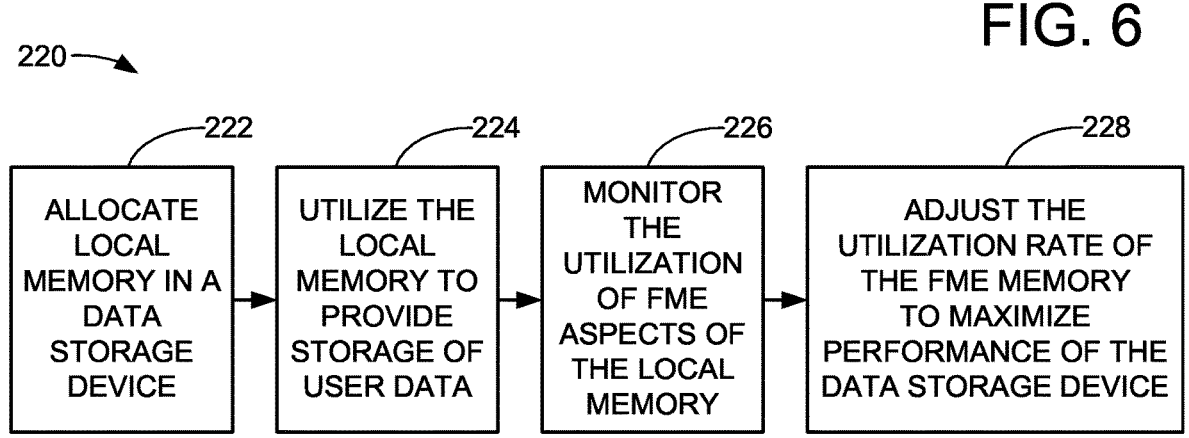
FIG. 7 is a sequence diagram to show an operational flow of operations carried out using various embodiments.

FIG. 7 provides a flow sequence 220 to illustrate steps carried out in accordance with various embodiments. Other steps can be utilized so the flow of FIG. 7 is merely illustrative and is not limiting.

Step 222 shows the allocation of local memory in a data storage device for storage of user data and control information during the operation of the device. Step 224 in FIG. 7 shows the subsequent operation of utilizing the local memory to provide storage for user data, such as by the read buffer and write cache discussed above.

Step 226 shows the operation of monitoring the utilization of the ferroelectric memory aspects of the allocated local memory, the memory formed of FME units.

Step 228 shows an adjustment of the utilization rate of the FME memory to maximize performance of the data storage device.

Figure 8:
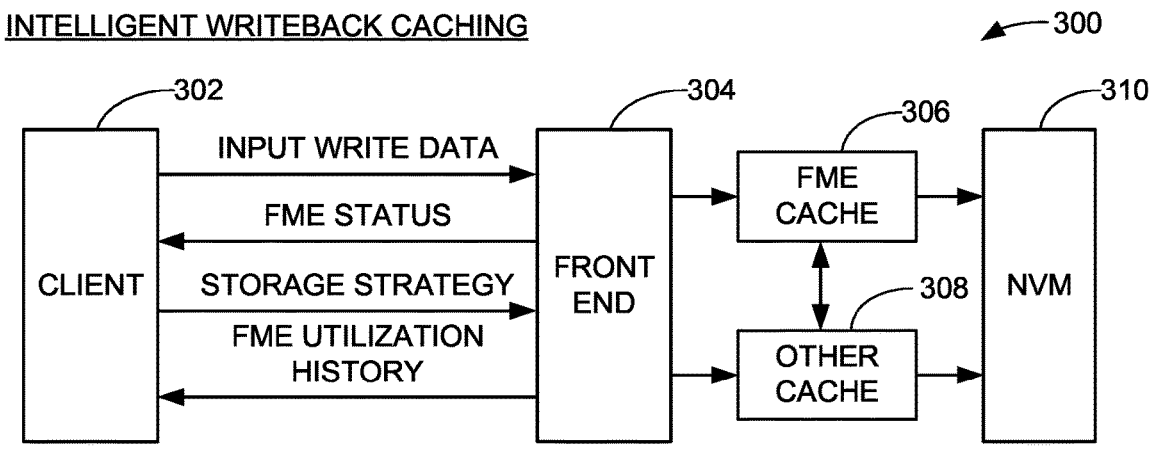
FIG. 8 is a functional block representation of a system that carries out intelligent writeback caching in accordance with some embodiments.

FIG. 8 shows another system 300 to illustrate intelligent writeback caching in accordance with some embodiments. The system 300 can incorporate the data storage devices 100, 110, or can represent other processing environments. The system 300 includes a client device 302 coupled to a data storage device having a front end controller circuit 304, an FME based cache memory 306, another non-FME based cache memory 308 (such as DRAM, flash, NVRAM, SRAM, RRAM, etc.), and an NVM 310. It is contemplated that the FME cache 306 and the other cache 308 are configured to temporarily store writeback cached data pending transfer to the NVM 310. Other forms of data may be stored in these caches as well.

During operation, input write data sets are transferred from the client to the front end 304 for processing. The front end determines a current utilization of the FME cache to determine, inter alia, whether the entirety of the input write data set can be stored in the FME cache (e.g., sufficient cache lines are available to permit the writing of the data set to the FME cache 306). This may include the availability of additional room to accommodate metadata, ECC values, etc.

Based on this determination, an FME status value (which may be a single bit or multiple bits) is returned to the client as shown. The FME status value indicates whether the write data set can be stored in the FME cache, or if insufficient room is available to accommodate the write data set in the FME cache. In some cases, the front end controller 304 proceeds to store the data in the optimum location and merely reports the results to the client (e.g., the data set is stored to the FME or in other cache). In other cases, the front end controller directs the storage to the FME cache or the other cache, or makes other arrangements (e.g., withdraws and resubmits the write request to a different device, at a different time, etc.).

As discussed previously, writeback data caching enables data to be stored locally prior to transfer to the ultimate storage location (main NVM). Command complete statuses are issued to the client signifying the completion of the command even if the data set is still pending in cache. To this end, it is common to utilize non-volatile cache to ensure the data set is not lost in the event of a power down or other exception condition. It may therefore be appropriate to perform inter-cache transfers at appropriate locations, such as transferring data out of FME cache to the NVM over other transfers, such as data retained in flash, based on differences in data retention characteristics of these respective memory types.

FIG. 8 further shows in some embodiments the provision of a storage strategy input from the client 302 to the front end 304. The storage strategy can include a selected mode of operation for the client (such as deterministic operation, specified quality of service levels, etc.) which can be used to enable the front end controller to make intelligent decisions based on FME capacity and utilization history and other monitored operational parameters associated with the system, both during normal writeback processing and during power down and other exception event processing.

FIG. 8 also shows that certain history information, such as FME utilization history data, can be provided by the front end controller 304 to the client 302 to enable storage selection operations at the client level.

Figure 9:
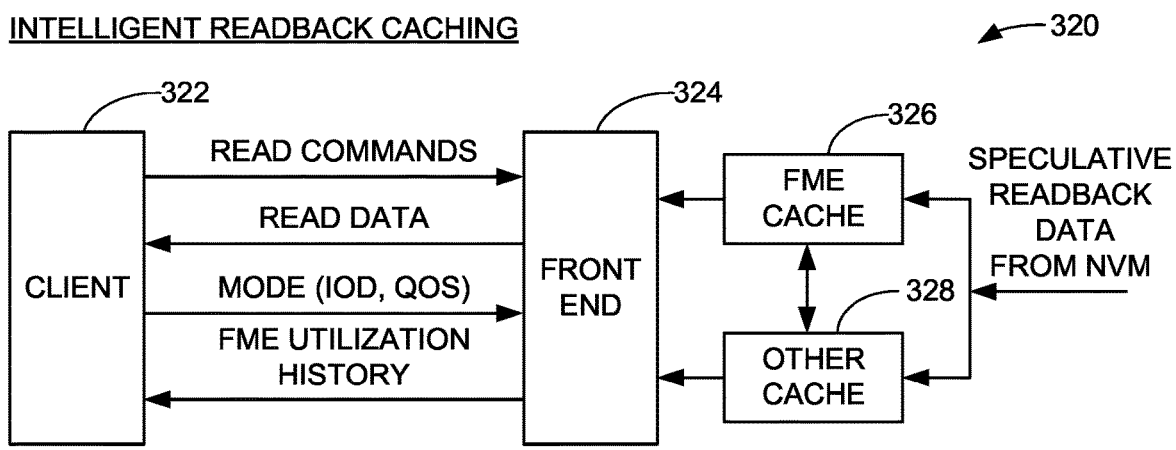
FIG. 9 is a functional block representation of a system that carries out intelligent readback caching in accordance with some embodiments.

FIG. 9 illustrates another system 320 similar to the system 300 in FIG. 8 to depict intelligent readback caching in some embodiments. A client 322 is coupled as before to a front end controller 324, which in turn has an FME cache 326 and at least one other form of cache 328. In this case, read commands are issued by the client to the front end controller which in turn processes and arranges the requested data to be returned from the NVM (or, in the case of a cache hit, from one of the caches).

In at least some embodiments, intelligent readback caching involves requesting additional readback data from the NVM for caching in the FME cache 326 or the other cache 328. The decisions on which speculative read data sets to pull into the cache(s) can be based on a variety of factors, including recent data write and read history, availability and utilization of FME and other cache, selected mode of operation from the client, etc.

In some cases, the respective circuits of FIGS. 8 and 9 can be combined into a single data storage device having both the respective writeback and readback data caching capabilities. A block of FME cache can be made available for use by the front end controller, with different portions/percentages allocated for use in storage of writeback and readback data. These values can be adjusted over time depending on operation (e.g., a read dominated or write dominated environment, command history, etc.).

Figure 10:
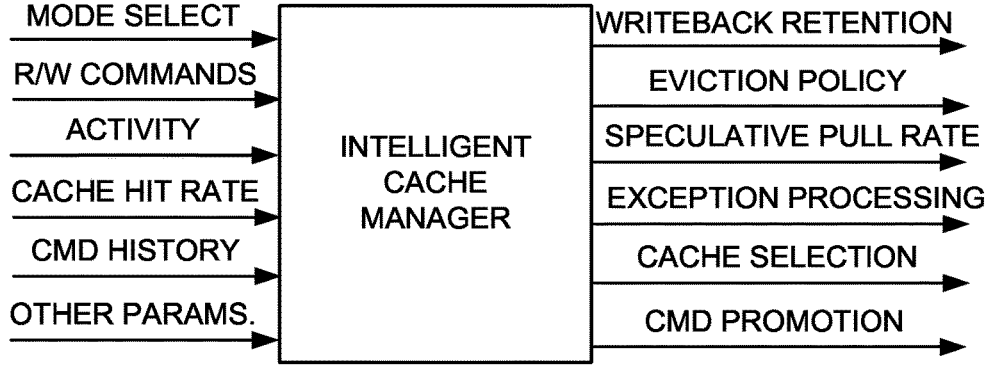
FIG. 10 is a functional block representation of an intelligent cache manager that can be configured to carry out the respective intelligent writeback and readback strategies of FIGS. 8-9 in some embodiments.

An intelligent cache manager 330 as in FIG. 10 can be used to select appropriate writeback, readback and exception event (e.g., power down, etc.) strategies for the device to maintain selected levels of performance, since these strategies, while different, can be interrelated. For example, speculative readback data may be jettisoned from the FME cache to accommodate a pending writeback data set, etc. Command order sequence tracking is carried out to ensure that collisions do not occur between pending write and read commands, so that, for example, the correct version of a given data set is returned, prior version writeback data sets are not unnecessarily written, etc.

As shown in FIG. 10, a number of inputs can be supplied or otherwise monitored/generated by the intelligent cache manager 330. These can include but are not limited to mode select inputs from the client, the actual read/write (R/W) commands supplied by the client, activity levels of the controller, cache hit rates on speculative data, command history for recent commands from the client, and other parameters.

Responsive to these, the intelligent cache manager manages the utilization of the FME front-end cache (as well as other, non-FME cache locations) including by establishing writeback retention policies (including where and how long writeback data sets are cached prior to writing to NVM), eviction policies for the FME cache, a speculative readback data rate for the FME (including ratios between FME and other cache), exception processing (including writeback sequences in the event of a power down event to transfer all pending writeback data to NVM), cache selection (including systems that have more than one type of available FME style cells to accommodate different types of data).

In this latter case, it will be noted that some types of FME cache may provide different operational response characteristics as compared to other types of FME cache; for example, some may have faster write/read times but at the expense of data retention rates without refresh, etc. Hence, in some embodiments different FME types of cells may be provided and utilized to meet different operational needs.

In view of the foregoing, the above described operation of the various embodiments presented herein can be carried out in such a way as to utilize the FME based cells of the local memory to maximize system operation through cache management techniques. In one aspect, this operation can include retrieving speculative readback data from the main memory NVM into the front-end cache responsive to execution of at least one read command from a client device.

The controller can operate by evaluating a write command from the client, providing a first response to the client responsive to available cache lines in the front-end cache to accommodate writeback data associated with the write command, and providing a second response to the client responsive to a lack of available cache lines in the front-end cache to accommodate the writeback data associated with the write command.

In this way, if the front end memory includes both memory that is FME based and other memory that has a different construction (such as DRAM, flash, etc.), write commands from the client can be evaluated to determine the most appropriate locations for the storage of the input user data. Similarly, read back data from the main NVM can similarly be distributed between FME based memory and non-FME based memory locations (e.g., DRAM, flash) based on the specific needs of the system. This allows intelligent caching of data in ferroelectric memory in a data storage device.

In view of the foregoing, it will be understood that the present disclosure contemplates using ferroelectric memory to form one or more of these various local memory locations of a storage device. A particularly valuable configuration is to form the write cache of ferroelectric memory (rather than flash memory as currently implemented). In some cases, the read buffer may also be formed of ferroelectric memory. In still further cases, a large ferroelectric memory may be utilized (such as a 2D or 3D structure) and portions of the memory are separately and potentially allocated for use as separate write cache and read buffer locations. It will be noted that other aspects of the local memory can also be implemented using ferroelectric memory.

As noted above, ferroelectric memory combines the speed advantages of DRAM with the non-volatile and stackability of flash. Ferroelectric memory is based on FMEs, or ferroelectric memory elements. FMEs can take a large variety of forms (e.g., FTJs, FeFETs, 1T1FC, 1T4FC, 2T2FCs, etc.). Regardless of configuration, an FME stores data in relation to a programmed electric polarity impressed upon an embedded ferroelectric layer. Because FMEs provide read/programming speeds in the nanosecond range, these elements provide a number of potentially valuable usages in the front end of an otherwise conventional storage device.

Quality of service parameters managed by the intelligent cache manager can include a metric of data I/O performance that can be sustained over a selected period of time. The metric can include overall data transfer times, numbers of read commands that can be processed, observed BER rates, etc. The quality of services can be guaranteed for a selected period of time as an I/O deterministic mode of operation in accordance with the NVMe (Non-Volatile Memory Express) standard.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
responsive to execution of at least one read command from a client, retrieving speculative readback data from a main memory into a front-end cache arranged as a non-volatile memory (NVM) comprising ferroelectric memory element (FME) cells; and
evaluating a write command from the client, providing a first status value to the client responsive to available cache lines in the front-end cache to accommodate writeback data associated with the write command, providing a second status value to the client responsive to a lack of available cache lines in the front-end cache to accommodate the writeback data associated with the write command.

2. The method of claim 1, further comprising writing the writeback data to the front-end cache responsive to the first status value,
wherein evaluating a write command from the client comprises determining there are available cache lines in the front-end cache, and
wherein the retrieving of the speculative readback data and the writing of the writeback data carried out by an intelligent cache manager responsive to at least one input based on utilization of the front-end cache.

3. The method of claim 1, further comprising writing the writeback data to a second front-end cache not formed of FME cells responsive to the second status value, wherein evaluating a write command from the client comprises determining there is a lack of available cache lines in the front-end cache.

4. The method of claim 2, further comprising receiving a mode select input from the client associated with utilization of the front-end cache as directed by the client.

5. The method of claim 4, wherein an amount of the speculative readback data retrieved from the main memory is selected responsive to the mode select input from the client.

6. The method of claim 4, wherein the first and second values are generated responsive to the mode select input from the client.

7. The method of claim 2, wherein the at least one input comprises at least a selected one of a mode select input from the client, a cache hit rate observed upon the speculative readback data in the front-end cache, or a command history comprising recently issued and completed read/write commands from the client.

8. The method of claim 2, wherein the intelligent cache manager circuit implements a writeback caching strategy to manage the writing of the writeback data, including determining whether the writeback data are to be stored in the front-end cache or a different cache not formed of FME cells.

9. The method of claim 8, wherein the writeback caching strategy includes a determination of how long the writeback data stored in the front-end cache persists before being transferred to a main NVM data storage memory coupled to the front-end cache, the main NVM data storage memory comprising at least a selected one of flash memory or rotatable magnetic recording memory.

10. The method of claim 2, wherein the intelligent cache manager circuit implements a speculative readback strategy to manage the reading of the speculative readback data, including determining how long the speculative readback data are retained in the front-end cache.

11. The method of claim 2, wherein the intelligent cache manager implements an exception event processing strategy to manage the front-end cache responsive to an exception event associated with a loss of power to the front-end cache, including determining a priority regarding a transfer of the writeback data from the front-end cache to a main NVM data storage memory coupled to the front-end cache, the main NVM data storage memory comprising at least a selected one of flash memory or rotatable magnetic recording memory.

12. The method of claim 2, wherein the FME cells of the front-end cache are formed of at least a selected one of the following FME cell construction types: FeRAM cells, FeFET cells or FTJ cells.

13. An apparatus comprising:
a main NVM memory store coupled to a front-end cache, the front-end cache arranged as a non-volatile memory (NVM) comprising ferroelectric memory element (FME) cells; and
an intelligent cache manager circuit configured to generate a speculative readback data strategy in which non-requested speculative readback data are transferred to the front-end cache from the main NVM memory in anticipation of a future read command from a client, and a writeback data strategy to store writeback data provided by the client to the front end cache, the writeback data strategy comprising providing a first status value to the client responsive to sufficient available capacity in the front-end cache to accommodate the writeback data.

14. The apparatus of claim 13, wherein the writeback data strategy further comprising providing a different second status value to the client responsive to insufficient available capacity in the front-end cache to accommodate the writeback data.

15. The apparatus of claim 14, further comprising a second front-end cache formed of non-FME based volatile or non-volatile memory cells, and wherein the intelligent cache manager circuit stores the writeback data to the second front-end cache responsive to the second status value.

16. The apparatus of claim 14, wherein the intelligent cache manager selects the speculative readback data strategy and the writeback data strategy responsive to a mode select input supplied by the client.

17. The apparatus of claim 14, wherein the writeback caching strategy includes a determination of how long the writeback data stored in the front-end cache persists before being jettisoned therefrom to another memory location.

18. The apparatus of claim 14, wherein the writeback caching strategy includes jettisoning at least a portion of the non-requested speculative readback data from the front-end cache to accommodate the writeback data in the front-end cache.

19. The apparatus of claim 14, wherein the intelligent cache manager circuit further generates an exception event processing strategy comprising a determination of priority regarding a transfer of the writeback data from the front-end cache to the main NVM data storage memory prior to a loss of available applied power to the front-end cache.

20. The apparatus of claim 14, wherein the FME cells of the front-end cache are managed by the intelligent cache manager to sustain a selected quality of service data transfer level.

* * * * *